United States Patent
Park et al.

(10) Patent No.: US 7,345,701 B2
(45) Date of Patent: Mar. 18, 2008

(54) LINE BUFFER AND METHOD OF PROVIDING LINE DATA FOR COLOR INTERPOLATION

(75) Inventors: Sang-Hyun Park, Kyunggi-Do (KR); Jong-Sik Jeong, Seoul (KR); Yeon-Cheol Lee, Kyunggi-Do (KR); Kang-ju Kim, Kyunggi-Do (KR); Hyung-Man Park, Seoul (KR); Boo-Dong Kwak, Kyunggi-Do (KR)

(73) Assignee: Samsung Electro-Mechanics Co., Ltd., Kyunggi-do (KR)

( * ) Notice: Subject to any disclaimer, the term of this patent is extended or adjusted under 35 U.S.C. 154(b) by 1019 days.

(21) Appl. No.: 10/626,636

(22) Filed: Jul. 25, 2003

(65) Prior Publication Data

US 2004/0263650 A1 Dec. 30, 2004

(30) Foreign Application Priority Data

Jun. 26, 2003 (KR) .................... 10-2003-0042160

(51) Int. Cl.
*H04N 5/76* (2006.01)
*H04N 3/14* (2006.01)
*H04N 5/228* (2006.01)
*G06K 9/32* (2006.01)
*G11C 19/00* (2006.01)

(52) U.S. Cl. .............. 348/231.99; 348/280; 348/222.1; 382/300; 377/54; 365/78

(58) Field of Classification Search .............. 348/280, 348/231.99; 382/300
See application file for complete search history.

(56) References Cited

U.S. PATENT DOCUMENTS 6,157,414 A * 12/2000 Sakamoto ................. 382/300
6,593,965 B1 * 7/2003 Miyamoto ................. 348/280
6,593,967 B1 * 7/2003 McGarvey et al. ........ 348/312
6,674,464 B1 * 1/2004 Mizutani et al. ......... 348/222.1
6,762,792 B1 * 7/2004 Matsumura ............. 348/E9.01
6,829,016 B2 * 12/2004 Hung ...................... 348/581
6,933,970 B2 * 8/2005 Koshiba et al. ............ 348/273
7,034,868 B2 * 4/2006 Sasaki ..................... 348/222.1
7,116,358 B1 * 10/2006 Sasaki ..................... 348/231.6

FOREIGN PATENT DOCUMENTS

EP   1 111 904 A2    6/2001
JP   2000-115480     4/2000

* cited by examiner

*Primary Examiner*—Nhan T. Tran
(74) *Attorney, Agent, or Firm*—Morgan, Lewis & Bockius LLP

(57) ABSTRACT

A line buffer and a method of providing data to a 3×3 line interpolation processor using the line buffer in an image processing system, such as a digital camera, includes a readable and writable single memory, a buffer register having a prior data area storing first line image data, which has been stored in a memory, in a unit of 2m bits, and having a present data area storing second image data, which is inputted from an image sensor in a unit of m bits, in a unit of the 2m bits, and a memory controller providing the memory with a chip enable signal, a write enable signal, and an address indicating locations of the first and second line image data stored in the buffer register, reading and writing the first and second line image data from and on the memory, and outputting the first and second line image data and a third line image data, which is inputted from the image sensor.

15 Claims, 7 Drawing Sheets

Fig. 1A

PRIOR ART

| R1 | G1 | R2 |
|----|----|----|
| G2 | B1 | G3 |
| R3 | G4 | R4 |

Fig. 1B

PRIOR ART

| G1 | R1 | G2 |
|----|----|----|
| B1 | G3 | B2 |
| G4 | R2 | G5 |

Fig. 1C

PRIOR ART

| G1 | B1 | G2 |
|----|----|----|
| R1 | G3 | R2 |
| G4 | B2 | G5 |

Fig. 1D

PRIOR ART

| B1 | G1 | B2 |
|----|----|----|
| G2 | R1 | G3 |
| B3 | G4 | B4 |

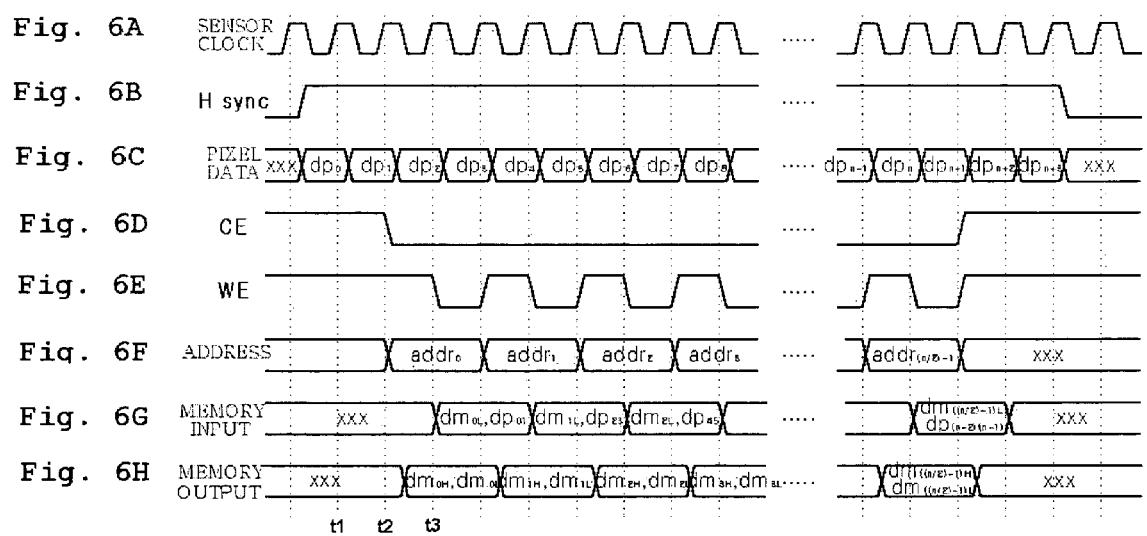

LINE BUFFER AND METHOD OF PROVIDING LINE DATA FOR COLOR INTERPOLATION

CROSS-REFERENCE TO RELATED APPLICATION

This application claims to benefit of Korean Patent Application No. 2003-042160, filed Jun. 26, 2003, in the Korean Intellectual Property Office, the disclosure of which is incorporated herein by reference.

BACKGROUND OF THE INVENTION

1. Field of the Invention

The present invention relates to a line buffer and a method of providing data to an image processor performing a 3×3 line interpolation method in a system having the image processor, such as a digital camera, and more particularly, to a line buffer and a method of providing 3×3 line data to an image processor required to perform a 3×3 line interpolation method using a single memory in a system, such as a digital camera, so as to reduce the number of addresses and memory control signals required for controlling the single memory.

2. Description of the Related Art

An apparatus, such as a digital camera, having an image processor, is required to output more information about each pixel to obtain a full color image since a single charge couple device (CCD) image sensor is used in the apparatus. At least three types of data are required to generate the same full color image. The at least three types of data are extracted from three independent R, G, B values (pixel data). A sensor (pixel), such as the CCD image sensor, corresponding to a color image is provided with a color filter array (CFA) having arranged sensors (pixels). A pixel value corresponding to one of R, G, B colors is generated from each of the arranged sensors, and pixel values corresponding to other ones of the R, G, B colors, which are not extracted from the each of the arranged sensors, can be calculated from the pixel values of the adjacent sensors disposed around the each of the arranged sensors using the CFA. This is a well-known general method in the apparatus, and a Bayer pattern (matrix) is known as the CFA. Color interpolation or color demisaicing is known for restoring the color image from the pixel values obtained from the sensors.

Interpolation algorithms to perform an interpolation method are classified into non-adaptive algorithms and adaptive algorithms. The non-adaptive algorithms has advantages in performing an interpolation procedure using a fixed (invariable) pattern with respect to all pixels, and the number of calculation operations performed in the interpolation procedure is reduced. To the contrary, the adaptive algorithms has advantages in obtaining the color image better than the non-adaptive algorithms. However, the number of calculation operations performed in the interpolation procedure increases in the adaptive algorithms since adjacent pixels disposed around a center pixel is used to calculate the pixel value corresponding to the other ones of the R, G, B colors, which are not extracted from the each of the sensors.

The interpolation method performed in the non-adaptive algorithms includes a most adjacent pixel interpolation method, a both line interpolation method, an intermediate value interpolation method, and an incremental color change interpolation method. Another method performed in the adaptive algorithms includes a pattern coinciding interpolation method, an interpolation method using a threshold-based variable of an inclined ratio, a boundary method, and a preservation interpolation method.

The CCD image sensor is provided with a plurality of optical diodes arranged on a silicon wafer, and the optical diodes convert optical energy into electrical energy when receiving light. A complementary metal oxide semiconductor (CMOS) image sensor consumes electrical power less than the CCD image sensor and is smaller in size than the CCD image sensor. However, the CMOS image sensor is a semiconductor image sensor having a reduced picture quality more than the CCD image sensor.

FIGS. 1A through 1D are views explaining a 3×3 line interpolation method of a Bayer pattern. When an apparatus receives the Bayer pattern having 3×3 lines shown in FIG. 1A, the apparatus generates R, G, and B values as follows.

$$R(R1+R2+R3+R4)/4,\ G=(G1+G2+G3+G4)/4,\ B=B1$$

If the apparatus receives the Bayer pattern having the 3×3 lines shown in FIG. 1B, the apparatus generates the R, G, and B values as follows.

$$R=(R1+R2)/2,\ G=G3,\ B=(B1+B2)/2$$

If the apparatus receives the Bayer pattern having 3×3 lines shown in FIG. 1C, the apparatus generates the R, G, and B values as follows.

$$R=(R1+R2)/2,\ G=G3,\ B=(B1+B2)/2$$

If the apparatus receives the Bayer pattern having 3×3 lines shown in FIG. 1D, the apparatus generates the R, G, and B values as follows.

$$R=R1,\ G=(G1+G2+G3+G4)/4,\ B=(B1+B2+B3+B4)/4$$

In the 3×3 Bayer pattern interpolation method, an average value of pixel values of adjacent pixels is calculated as described above. In another interpolation method, maximum and minimum pixel values are excluded from the pixel values to calculate the average values of the adjacent pixels. The apparatus requires to simultaneously input 3 line image data to the image processor so as for the image processor to perform the above interpolation method.

FIG. 2 is a block diagram showing a structure for inputting three line image data to an image processor 203 to perform a 3×3 line interpolation method.

First line image data each having m bits are inputted to a line buffer 202 of a memory controller 206 from an image sensor 201 having n pixels on each line according to vertical and horizontal synchronization signals vsync, hsync. The memory controller 206 stores the inputted first line image data in a first memory 204. Second line image data each having the m bits are inputted to the line buffer 202 of the memory controller 206 from the image sensor 201 having the n pixels on each line, the memory controller 206 stores the inputted second line image data in a second memory 205. The memory controller 206 transmits a control enable (CE) signal, a write enable (WE) signal, and an address signal (n) indicating locations, in which the first and second line image data are stored, together with the first and second line image data to the first and second memories 204, 205.

FIGS. 3A through 3D are timing charts showing an operation of a buffer simultaneously outputting the 3×3 line image data to the image processor to perform the 3×3 line interpolation method in accordance with the Bayer pattern shown in FIGS. 1A through 1D.

FIGS. 2 and 3A through 3D show a memory clock MLCK, a vertical synchronization signal VSYNC representing a starting point of a frame sensed by the image sensor

201, and a horizontal synchronization signal HSYNC representing a starting point of each line of the image data outputted from the image sensor 210. The image data constitutes the Bayer pattern (matrix) inputted from the image sensor 201. The pixel value of each image data has the m bits. In FIGS. 3A through 3D, the vertical and horizontal synchronization signals VSYNC, HSYNC are in a disable state when being a high level, and in an enable state when being a low level. As shown in FIGS. 3A through 3D, when the vertical synchronization signal VSYNC is in the enable state at a first time position t1, the image data corresponding to a single image frame starts to be outputted from the image sensor 201. When the horizontal synchronization signal HSYNC is in the enable state at a second time position t2, the memory controller 206 outputs the WE signal to the first memory 204, and the R, G, B image data of a first line is transmitted from the image sensor 201 to the memory controller 206. The memory controller 206 stores the R, G, B image data outputted between the second time position t2 and a third time position t3 in the first memory 204. When the horizontal synchronization signal HSYNC is in the enable state at a fourth time position t4, the memory controller 206 outputs the WE signal to the first memory 204, and the R, G, B image data of a second line is transmitted from the image sensor 201 to the memory controller 206. The memory controller 206 stores the R, G, B image-data outputted between the fourth time position t4 and a fifth time position t5 in the second memory 205. The first line image data stored in the first memory 204, the second line image data stored in the second memory 205, and the R, G, B image data of a third line outputted after a sixth time position t6 are transmitted to the image processor 203, which performs the 3×3 line interpolation method according to the memory clock MCLK.

According to the structure shown in FIG. 2, the apparatus requires two memories, such as the first and second memories 204, 205, to store the first line image data and the second line image data each having n pixels so as to supply the image processor 203 with 3×3 line data to perform the 3×3 line interpolation method. In addition, the CE and WE signals are required to enable the first and second memories 204, 205, and two different address signals (2 n) are needed to indicate the locations, in which the first and second line image data are stored in the first and second memories 204, 205, respectively.

Recently, as the number of the pixels mounted in the apparatus including the image processor 203, such as the digital camera or a digital camcorder, increases, a capacity of a memory, such as the first and second memories 204, 205, is required to be increased according to the increase of the number of the pixels mounted in the apparatus including the image processor 203, such as the digital camera or a digital camcorder. This causes not only a physical size of the memory but the number of the addresses and control signals, such as the CE or WE signal controlling the first and second memories 204, 205, to be increased, thereby making the use of the memory difficult.

A Japanese patent laid-open no. 2000-115480 discloses an image reading apparatus having a unit storing image data inputted from three image sensors in a unit of n bits in a memory. In the image reading apparatus, a data controller is disposed between the image sensor and the memory. The image data is stored in the data controller, and if the number of the image data is greater than a reference number, the image data stored in the data controller is outputted to the memory, thereby reducing a time period in which the image data is transmitted through a data line of the image reading apparatus. During an idling period of the data line, the image reading apparatus may use the data line to transmit data to a host computer.

However, memories used in the image reading apparatus for performing a 3×3 line interpolation method cannot be reduced to a single memory. Moreover, the control of the memories of the image reading apparatus can not be simplified although the image reading apparatus reduces the time period of the data line occupied by the image data.

SUMMARY OF THE INVENTION

In order to solve the above and/or other problems, it is an aspect of the present invention to provide a line buffer supplying 3 line data to an image processor performing a 3×3 line interpolation method using a single memory.

It is another aspect of the present invention to simplify a memory control by reducing the number of addresses required for controlling a memory in a line buffer supplying 3 line data to an image processor performing a 3×3 line interpolation method.

It is another aspect of the present invention to reduce the number of addresses required for controlling a memory in a line buffer supplying 3 line data to an image processor performing a 3×3 line interpolation method.

Additional aspects and/or advantages of the invention will be set forth in part in the description which follows and, in part, will be obvious from the description, or may be learned by practice of the invention.

To achieve the above and/or other aspects, a memory providing apparatus for an image data interpolation in an image processing system having an image sensor outputting line image data from a sensed image includes a readable and writable single memory, a buffer register having a prior data area storing first line image data, which has been stored in the memory, in a unit of 2 m bits, and having a present data area storing second image data, which is inputted in a unit of m bits, in a unit of the 2 m bits, and a memory controller providing the memory with a chip enable signal, a write enable signal, and an address indicating locations of the first and second line image data stored in the buffer register, reading and writing the first and second line image data from and on the memory, and outputting the first and second line image data and a third line image data, which is inputted from the image sensor.

According to another aspect of the present invention, the memory providing apparatus includes an image signal processor performing an image data interpolation when receiving the first, second, and third line image data from the memory controller.

According to another aspect of the present invention, the memory includes a 4 m bits memory cell having upper and lower areas storing in a memory cell unit of 2 m bits data, respectively, which are readable and writable by the memory controller.

According to another aspect of the present invention, the memory controller includes three data transmission lines through which the first, second, and third line image data are outputted from the memory controller.

According to another aspect of the present invention, the memory controller controls the chip enable signal and the write enable signal to be enabled and disabled, respectively, and reads the first line image data from the memory when the chip enable signal and the write enable signal are enabled and disabled, respectively, to store the first line image data in the prior data area of the buffer register, and the memory controller controls the chip enable signal and the write enable signal to be enabled, and stores the first and second line image data, which have been stored in the buffer register, in the memory in a unit of the memory cell unit.

According to another aspect of the present invention, the memory providing apparatus includes an image signal processor performing a 3×3 line interpolation using the first, second, and third line image data, and first, second, and third data transmission lines through which the first, second, and third line image data are outputted from the memory controller, respectively. The memory controller reads the first and second line image data stored in the memory, transmits the first and second line image data through the first and second data transmission lines, and transmits the third line image data, which is inputted from the image sensor, through the third data transmission line according to the same clock.

According to another aspect of the present invention, the memory controller reads the first and second line image data stored in the memory, transmits the first and second line image data through the first and second data transmission lines, and transmits the third line image data, which is inputted from the image sensor, through the third data transmission line according to the same clock signal.

According to another aspect of the present invention, the line image data includes a Bayer pattern.

According to another aspect of the present invention, the image sensor includes one of charge coupled device image sensor and a complementary metal oxide semiconductor.

To achieve the above and/or other aspects, a method of providing line data for interpolation in an image processing system includes storing first line image data outputted from an image sensor in a unit of m bits in a present data area of a buffer register in a unit of 2 m bits, storing the first line image data of the present data area of the buffer register in a memory in the unit of the 2 m bits, refreshing the buffer register☐ reading the first line image data from the memory in the unit of the 2 m bits to store the read first line image data in a prior data area of the buffer register, and storing second line image data outputted from the image sensor in the unit of the m bits in the present data area of the buffer register in the unit of the 2 m bits, storing the first line image data and the second line image data stored in the prior data area and the present data area of the buffer register, respectively, in the memory in a unit of 4 m bits, and transmitting the first and second line image data stored in the memory and third line image data outputted from the image sensor to an image signal processor according to the same clock signal.

According to another aspect of the present invention, the transmitting of the first, second, and third line image data includes reading the first line image data stored in the memory using a memory controller connected to the memory, reading the second line image data stored in the memory using the memory controller, and outputting the third line image data inputted from the image sensor and the first and second line image sensor to the image signal processor through respective data transmission lines.

According to another aspect of the present invention, the transmitting of the first, second, and third line image data includes causing first and second data transmission lines to be connected between the memory and the image signal processor, and causing a third data transmission line to be connected between the image sensor and the image signal processor, and outputting the first line image data through the first data transmission line, the second line image data through the second data transmission line, and the third line image data through the third data transmission line according to the same clock signal.

According to another aspect of the present invention, the memory has a capacity able to store two line image data.

According to another aspect of the present invention, each of the first, second, and third line image data comprises a series of pixel data.

BRIEF DESCRIPTION OF THE DRAWINGS

These and/or other advantages of the invention will become apparent and more readily appreciated from the following description of the preferred embodiments, taken in conjunction with the accompanying drawings of which:

FIGS. 1A through 1D are views explaining a 3×3 line interpolation method of a Bayer pattern;

FIGS. 3 through 3D are timing charts showing an operation of a buffer simultaneously outputting the 3×3 line image data to the image processor to perform the 3×3 line interpolation method of FIGS. 1A through 1D;

FIGS. 6A through 6H are timing charts showing an operation of the memory apparatus simultaneously outputting 3×3 line image data to an image processor to perform the 3×3 line interpolation method of FIG. 4.

DETAILED DESCRIPTION OF THE PREFERRED EMBODIMENTS

Figure 2:
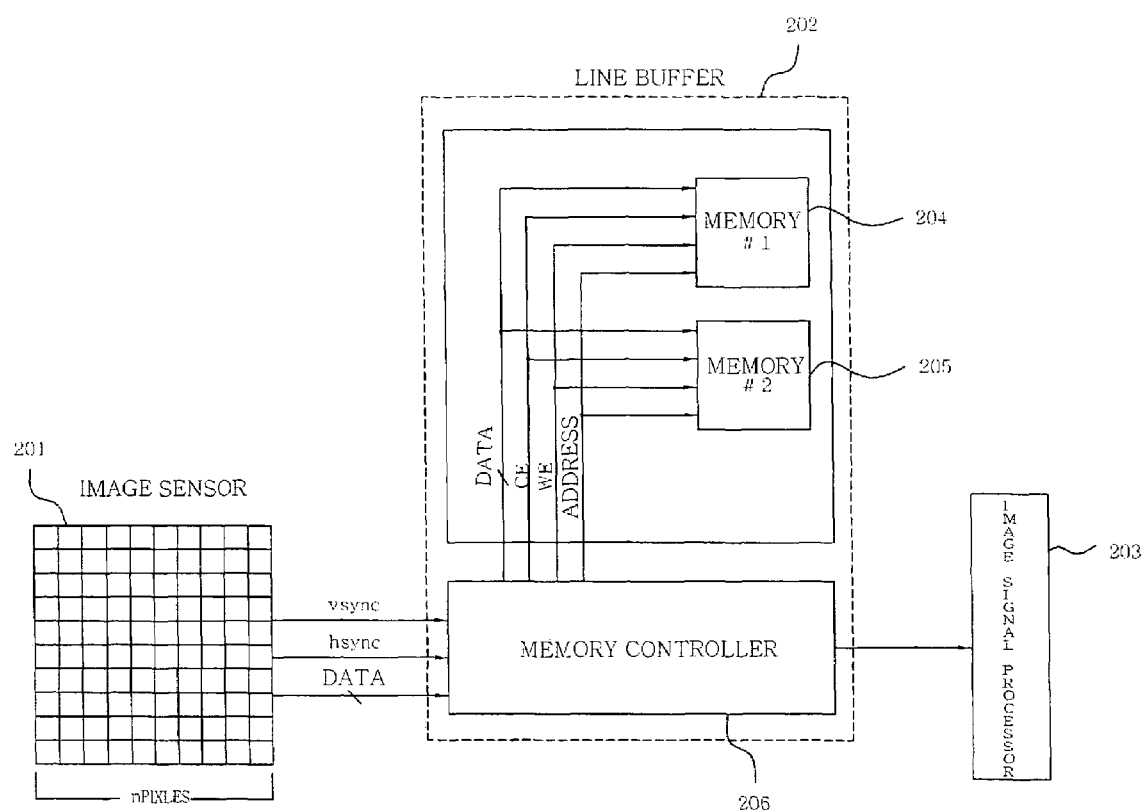
FIG. 2 is a block diagram simultaneously outputting 3×3 line image data to an image processor to perform the 3×3 line interpolation method of FIGS. 1A through 1D.
Figure 3:
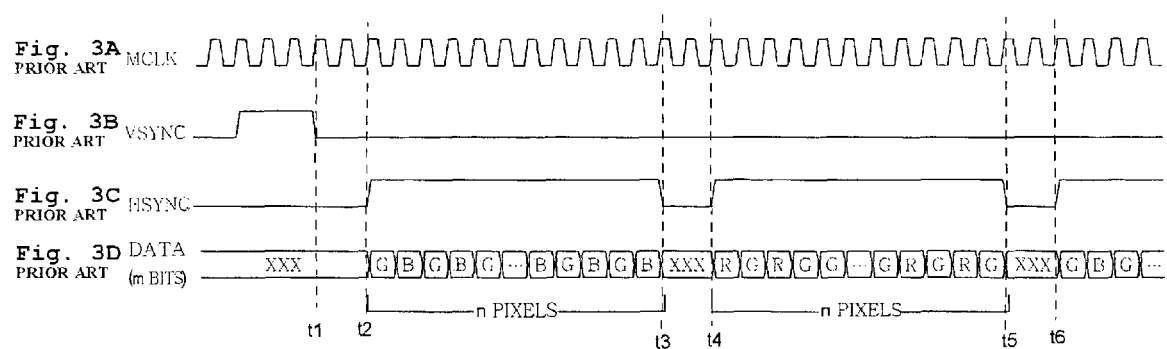

Reference will now be made in detail to the present preferred embodiments of the present invention, examples of which are illustrated in the accompanying drawings, wherein like reference numerals refer to the like elements throughout. The embodiments are described below in order to explain the present invention by reference to the figures.

Figure 4:
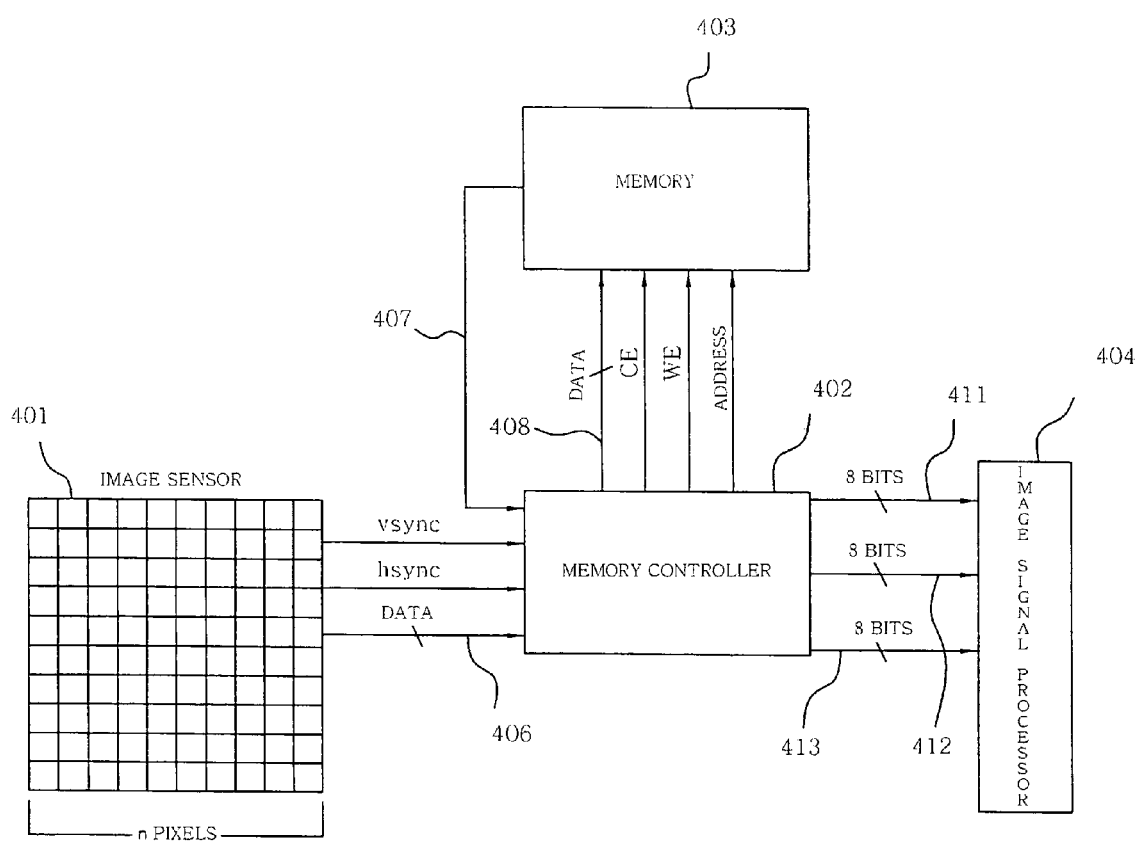
FIG. 4 is a block diagram showing a memory apparatus for a 3×3 line interpolation method according to an embodiment of the present invention.
Figure 5:
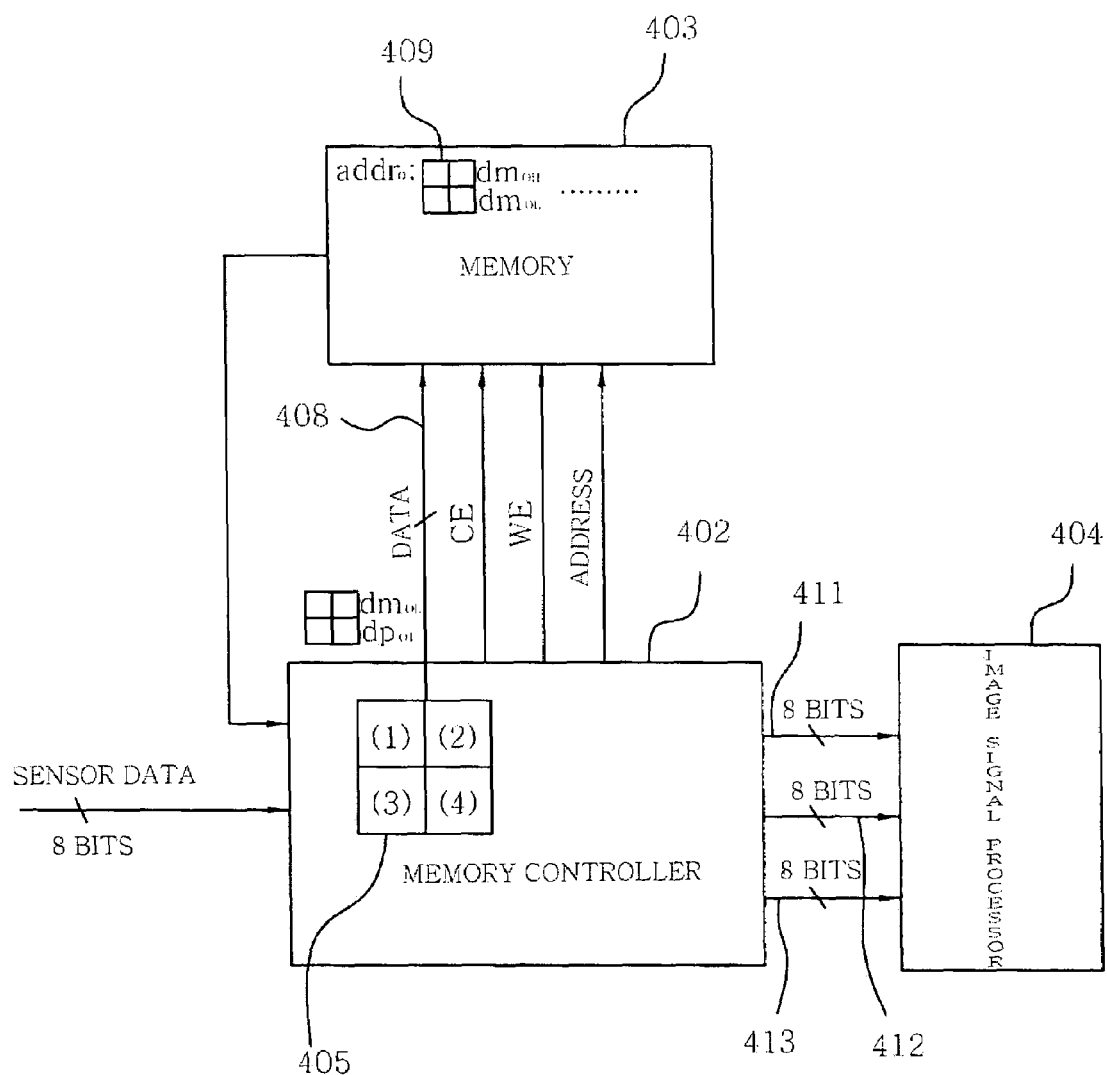
FIG. 5 is a structure showing data transmission between a memory and a memory controller of the memory apparatus shown in FIG. 4.

FIG. 4 is a block diagram showing a memory providing apparatus for a 3×3 line interpolation method according to an embodiment of the present invention. FIG. 5 is a structure showing a data transmission method between a memory 403 and a memory controller 402 of the memory providing apparatus shown in FIG. 4.

An image sensor 401 senses an image and stores a Bayer pattern (matrix) having n pixels on each line. Line image data is transmitted from the image sensor 401 to the memory controller 402 through a data line 406 in a unit of m bits per each pixel. Here, each pixel of the Bayer pattern has 8 Bits. That is, m is equal to 8. When first line image data of an image frame is outputted form the image sensor 401 to the memory controller 402, the memory controller 402 stores two pixel data in present data areas 3, 4 of a buffer register (line buffer) 405. Here, the buffer register 405 includes four data areas 1, 2, 3, 4. When a control enable (CE) signal and a write enable (WE) signal of a memory 403 become an enable state, the first line image data stored in the present data areas 3, 4 is transmitted from the present data areas to the memory 403 to be stored in the memory 403, and then, the butter register 405 is refreshed. When second line image data is transmitted from the image sensor 401 to the memory controller 402, the memory controller 402 stores two pixel data, that is, 2 m bits, in the present data areas 3, 4 in a unit of the m bits, respectively. When the memory controller 402 controls the WE signal to be a disable state corresponding to a reading mode of the memory 403, the first line image data stored in the memory 403 is transmitted to the memory controller 402 in a unit of 2 m bits to store the first line image data in prior data areas 1, 2 of the buffer register 405. Accordingly, the first line image data having the 2 m bits is stored in the prior data areas 1, 2 of the buffer register 405, and the second line image data having the 2 m bits is stored in the present data areas 3, 4 of the buffer register 405.

The memory controller 402 controls the WE signal to be the enable state to enable the memory 403, the first line image data and the second line image data stored in the prior data areas 1, 2 and the present data areas 3, 4, respectively, are transmitted to be stored in the memory 403. The first line image data and the second line image data are transmitted to the memory 403 through the data line 408 to be stored in a memory cell 409 corresponding to the buffer register 405. The memory controller 402 also transmits addresses indicating storage positions of the memory cell 409 to the memory 403. And then, the memory controller 402 refreshes the buffer register 402.

When third line image data is inputted into the memory controller 402 from the image sensor 401 through the data line 406, the memory controller transmits the third line image data and the first and second line image data stored in the memory. 403 through data transmission lines 411, 412, 413 in accordance with the same clock signal. The image signal processor 0.404 performs a 3×3 line interpolation method upon receiving the first, second, and third line image data inputted through the data transmission lines 411, 412, 413 in the unit of the m bits.

In the memory providing apparatus for the 3×3 line interpolation according to the present invention, the two line image data are transmitted to the memory in a memory cell unit, i.e., a unit of 4 m bits, by the buffer register 405. According to a conventional apparatus shown in FIG. 2, when each line of the frame includes n pixels, memories 204, 205 require 2 n addresses since each memory 204, 205 requires n addresses. To the contrary, the number of addresses required to store the image data in the memory 403 in the memory providing apparatus for the 3×3 line interpolation is reduced to n/2 according to the present invention.

FIGS. 6A through 6H are timing charts showing an operation of the memory providing apparatus simultaneously outputting 3×3 line image data to the image signal processor 404 to perform the 3×3 line interpolation method of FIG. 4. The operation of the memory providing apparatus will be explained with reference with FIGS. 5 and 6.

The sensor clock signal SENSOR CLOCK is used as a basic clock for the image sensor 401, memory controller 402 and the memory 403. When the horizontal synchronization signal hsync and the WE signal are high signals, the first line image data have been stored in lower areas of memory cells 409 of the memory 403 corresponding to addresses addr0, addr1, addr2, . . . , addrn/2. When the horizontal synchronization signal hsync indicating a starting point of the frame is in the enable state at a first time t1, the second line image data (dp0, dp1, dp2, dp3, dp4, . . . ) is outputted from the image sensor 401 in a unit of the m bits. When two pixel data dp01 (the pixel data dp0 and dp1 are combined into the two pixel data dp01) of the second line image data is outputted, the memory controller 402 controls the CE signal to be the enable state at a second time t2 to enable the memory 403, stores first two pixel data dp01 (dp0 and dp1) in the present data areas 3, 4 of the buffer memory 405, and stores data dm0L, which has been stored in the lower areas of the memory cells 409 of the memory 403 having an address addr0, in the prior data areas 1, 2 of the buffer register 405. The memory controller 402 controls the WE signal to be in the enable state to store the two pixel data dp01 (dp0 and dp1), which have been stored in the present data areas 3, 4 of the buffer register 405, and the data dm0L in the lower areas of the memory cells 409 having the address addr0.

Referring to the timing charts shown in FIGS. 5, 6G, and 6H, a subscript "L" indicates data stored in the lower area of the memory cell 409, and another subscript "H" indicates data stored in an upper area of the memory cell 409. Following two pixel data dp23, dp45 of the second line image data are subsequently stored in the memory cells 409 of the memory 403 having addresses addr1, addr2, addr3, . . . , addrn/2-1.

The first line image data dm0L stored in the upper area of the memory cell 409 determined as the prior data areas 1, 2 of the buffer register 405, and the second line image data dp01 stored in the lower area of the memory cell 409 determined as the present data areas 3, 4 of the buffer register 405 are transmitted to the memory 403 in the unit of 4 m bits corresponding to the memory cell 409 to be stored in the memory cell 409 having the address addr0. The data dm0L originally stored in the lower areas of the memory cell 409 having the address addr0 is stored in the upper areas of the memory cell 409 having the address addr0. That is, the data dm0L becomes dm0H according to a transcription rule of the present invention.

Accordingly, the first line image data dp01, which has been stored in the lower areas of the memory cell 409, is stored in the upper areas of the memory cell 409 as the data dm0H, and the second line image data dp01 is stored in the lower area of the memory cell 409. And then, the buffer register 405 is refreshed.

In the similar manner, regarding next pixel data dp23 of the same line image data, the data dm1L, which has been stored in the memory 403, is stored in the upper area of another (second) memory cell (not shown) of the memory 403 having another address addr1 through the buffer register 405, and the next pixel data dp23, which is received from the image sensor 401, is stored in the lower area of the another. (second) memory cell. The data dm2L, which has been stored in the memory 403, is stored in the upper area of another (third) memory cell (not shown) of the memory 403 having another address addr2 through the buffer register 405, and the next pixel data dp45, which is received from the image sensor 401, is stored in the lower area of the another (third) memory cell of the memory 403. The second line image data is stored in the memory cells 409 of the memory 403 in the same manner. Since the upper area of the memory 403 includes the first line image data dm0L, dm1L, dm2L, . . . and the lower area of the memory 403 includes the second line image data dp01, dp23, dp45, . . . at the memory cells 409, of which the number is 2/n, the number of the addresses required for storing the data in the memory 403 in the memory cell unit is n/2.

The first line image data dm0L stored in the memory cell of the memory having the address addr0, the second line image data, and the third line image data inputted from the image sensor 401 are inputted to the image signal processor 404 through the data transmission lines 411, 412, 413 in the unit of the m bits, respectively.

The memory controller 402 reads the data dp01 stored in the lower area of the memory cell of the memory 403 having the address addr0 to store the same in the prior data area of the buffer register 405, and stores first two pixel data of the third line image data in the present data area of the buffer register 405. And then, the memory controller 402 stores the data stored in the prior and present data areas of the buffer register 405 in the memory cell of the memory 403 having the address addr0. According to a following clock, fourth line image data received from the image sensor 401, the first two pixel data dp01 of the second line stored in the address addr0 of the memory 403, the first two pixel data of the third line are transmitted to the image signal processor 404 through the data transmission lines 411, 412, 413 in the unit of the m bits. The data inputted to the memory 403 and outputted from the memory 403 are described in FIGS. 6G and 6H as a memory input and a memory output, respectively.

As described above, the first, second, and third line image data, the second, third, and fourth line image data, or the third, fourth, and fifth line image data are simultaneously transmitted to the image signal processor 404.

Following data is stored in the memory 403 in the same manner and transmitted to the image signal processor 404 through the data transmission lines 411, 412, 413 in the unit the m bits.

Here, with a minimum capacity of the memory 403, pixel data of two lines, i.e., 2 n pixel data, can be stored in the memory.

Although the data transmission lines 411, 412, 413 are connected between the memory controller 402 and the image signal processor 404 to transmit the data having m bits in this specification, the present invention is not limited thereto. The m bit data transmission lines can be connected between the image signal processor 404 and the memory 403 and/or the image sensor 401 so that the data is transmitted from the memory to the image signal processor 404 by a control of the memory controller 402 instead of transmitting the data from the memory controller 402 to the image signal processor 404.

Although the buffer register 405 is disposed in an inside of the memory controller 402 as shown in FIG. 5, the buffer register 405 can be disposed in an outside of the memory controller 402 if the buffer is effectively controlled by the memory controller 402.

As described above, according to the data transmission method of the present invention, the data is stored in the memory in a unit of 4 m bits. Since there are the n pixels one line of the frame, the pixels data of the line of the frame is transmitted using the n/2 addresses so that the number of the addresses required in the memory providing apparatus is reduced by ¼. In addition, since a single memory is used in the memory providing apparatus, the memory providing apparatus requires a single CE signal and a single WE signal, which are required to control the memory, thereby reducing the number of control signals controlling the memory.

According to the present invention, the memory providing apparatus and the data transmission method are provided with the line buffer supplying the 3 line data to the image processor performing the 3×3 line interpolation method using the single memory.

Moreover, the memory providing apparatus and the data transmission method can simplify the memory control by reducing the number of the addresses required for controlling the memory in the line buffer supplying the 3 line data to the image processor performing the 3×3 line interpolation method.

Furthermore, the memory providing apparatus and the data transmission method can reduce the number of the addresses required for controlling the memory in the line buffer supplying the 3 line data to the image processor performing the 3×3 line interpolation method.

Although a few preferred embodiments of the present invention have been shown and described, it would be appreciated by those skilled in the art that changes may be made in this embodiment without departing from the principle and sprit of the invention, the scope of which is defined in the claims and their equivalent.

What is claimed is:

1. A memory providing apparatus for an image data interpolation in an image processing system having an image sensor outputting line image data from a sensed image, comprising:
    a readable and writable single memory;
    a buffer register having a prior data area storing first line image data, which has been stored in the memory, in a unit of 2 m bits, and having a present data area storing second line image data, which is inputted in a unit of m bits, in a unit of the 2 m bits; and
    a memory controller providing the memory with a chip enable signal, a write enable signal, and an address indicating locations of the first and second line image data stored in the buffer register, reading and writing the first and second line image data from and on the memory, and outputting the first and second line image data and a third line image data, which is inputted from the image sensor wherein the memory comprises a 4 m bits memory cell having upper and lower areas storing in a memory cell unit of 2 m bits data, respectively, which are readable and writable by the memory controller, and wherein the memory controller controls the chip enable signal and the write enable signal to be enabled and disabled, respectively, and reads the first line image data from the memory when the chip enable signal and the write enable signal are enabled and disabled, respectively, to store the first line image data in the prior data area of the buffer register, and the memory controller controls the chip enable signal and the write enable signal to be enabled, and stores the first and second line image data, which have been stored in the buffer register, in the memory in a unit of the memory cell unit.

2. The apparatus of claim 1, further comprising: an image signal processor performing an image data interpolation when receiving the first, second, and third line image data from the memory controller.

3. The apparatus of claim 1, further comprising:
    an image signal processor performing a 3×3 line interpolation using the first, second, and third line image data; and
    first, second, and third data transmission lines through which the first, second, and third line image data are outputted from the memory controller, respectively,
    wherein the memory controller reads the first and second line image data stored in the memory, transmits the first and second line image data through the first and second data transmission lines, and transmits the third line image data, which is inputted from the image sensor, through the third data transmission line according to a same clock.

4. The apparatus of claim 1, wherein the memory controller comprises:
    three data transmission lines through which the first, second, and third line image data are outputted from the memory controller.

5. The apparatus of claim 1, wherein the first, second and third line image data comprise a Bayer pattern.

6. The apparatus of claim 1, wherein the image sensor comprises: one of a charge coupled device image sensor and a complementary metal oxide semiconductor.

7. A memory providing apparatus for an image data interpolation in an image processing system having an image sensor outputting line image data from a sensed image, comprising:
   a readable and writable single memory;
   a buffer register having a prior data area storing first line image data, which has been stored in the memory, in a unit of 2 m bits and having a present data area storing second line image data, which is inputted in a unit of m bits, in a unit of the 2 m bits;
   a memory controller providing the memory with a chip enable signal, a write enable signal, and an address indicating locations of the first and second line image data stored in the buffer register, reading and writing the first and second line image data from and on the memory, and outputting the first and second line image data and a third line image data, which is inputted from the image sensor; and
   an image signal processor performing a 3×3 line interpolation using the first, second, and third line image data; and
   first, second, and third data transmission lines through which the first, second, and third line image data are outputted from the memory controller, respectively,
   wherein the memory controller reads the first and second line image data stored in the memory, transmits the first and second line image data through the first and second data transmission lines, and transmits the third line image data, which is inputted directly from the image sensor, through the third data transmission line according to a same clock.

8. The apparatus of claim 7, wherein the memory comprises a 4 m bits memory cell having upper and lower areas storing in a memory cell unit of 2 m bits data, respectively, which are readable and writable by the memory controller.

9. The apparatus of claim 7, wherein the first, second and third line image data comprise a Bayer pattern.

10. The apparatus of claim 7, wherein the image sensor comprises one of a charge coupled device image sensor and a complementary metal oxide semiconductor.

11. A method of providing line data for interpolation in an image processing system, the method comprising:
   storing first line image data outputted from an image sensor in a unit of m bits in a present data area of a buffer register in a unit of 2 m bits;
   storing the first line image data of the present data area of the buffer register in a memory in the unit of the 2 m bits;
   refreshing the buffer register;
   reading the first line image data from the memory in the unit of the 2 m bits to store the read first line image data in a prior data area of the buffer register, and storing second line image data outputted from the image sensor in the unit of the m bits in the present data area of the buffer register in the unit of the 2 m bits;
   storing the first line image data and the second line image data stored in the prior data area and the present data area of the buffer register, respectively, in the memory in a unit of 4 m bits; and
   transmitting the first and second line image data stored in the memory and third line image data outputted directly from the image sensor to an image signal processor according to a same clock signal.

12. The method of claim 11, wherein the transmitting of the first, second, and third line image data comprises: reading the first line image data stored in the memory using a memory controller connected to the memory; reading the second line image data stored in the memory using the memory controller; and outputting the third line image data inputted from the image sensor and the first and second line image sensor to the image signal processor through respective data transmission lines.

13. The method of claim 11, wherein the transmitting of the first, second, and third line image data comprises: causing first and second data transmission lines to be connected between the memory and the image signal processor, and causing a third data transmission line to be connected between the image sensor and the image signal processor; and outputting the first line image data through the first data transmission line, the second line image data through the second data transmission line, and the third line image data through the third data transmission line according to the same clock signal.

14. The method of claim 11, wherein the memory has a capacity able to store two line image data.

15. The method of claim 11, wherein each of the first, second, and third line image data comprises a series of pixel data.

* * * * *